E. A. ROGERS.
APPARATUS FOR APPLYING POWDERED MATERIAL TO PLANTS, &c.
APPLICATION FILED DEC. 30, 1914.

1,239,042.

Patented Sept. 4, 1917.
2 SHEETS—SHEET 1.

Witnesses:
Ernest A. Telfer
J. Murphy

Inventor
Edwin A. Rogers
By Jas. H. Churchill Atty

E. A. ROGERS.
APPARATUS FOR APPLYING POWDERED MATERIAL TO PLANTS, &c.
APPLICATION FILED DEC. 30, 1914.
1,239,042.
Patented Sept. 4, 1917.
2 SHEETS—SHEET 2.
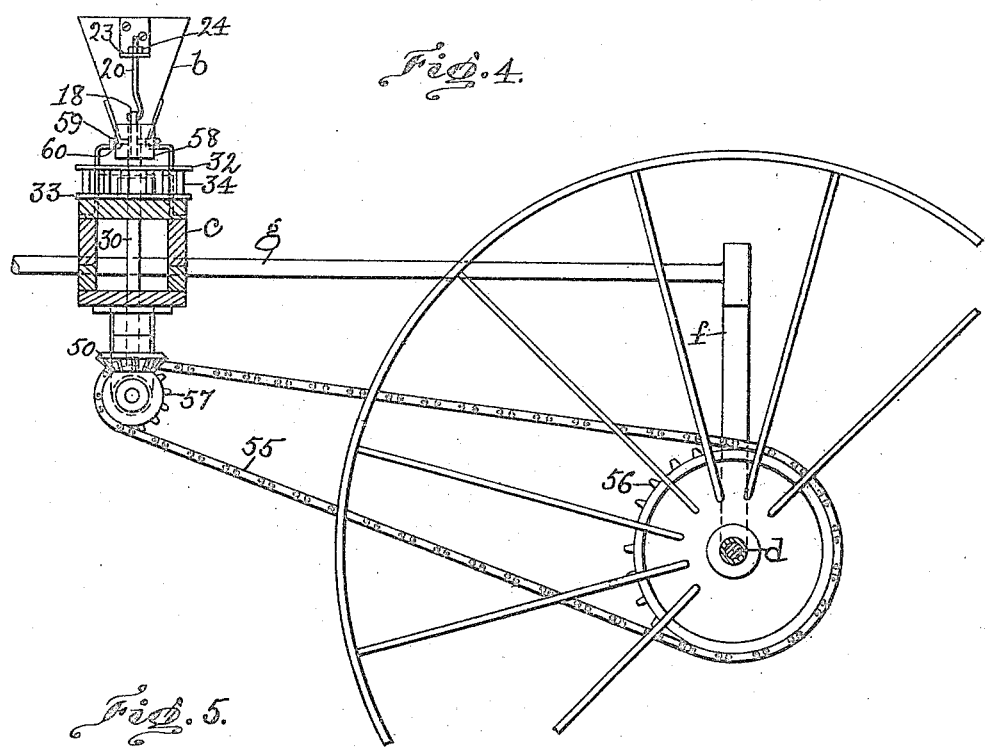
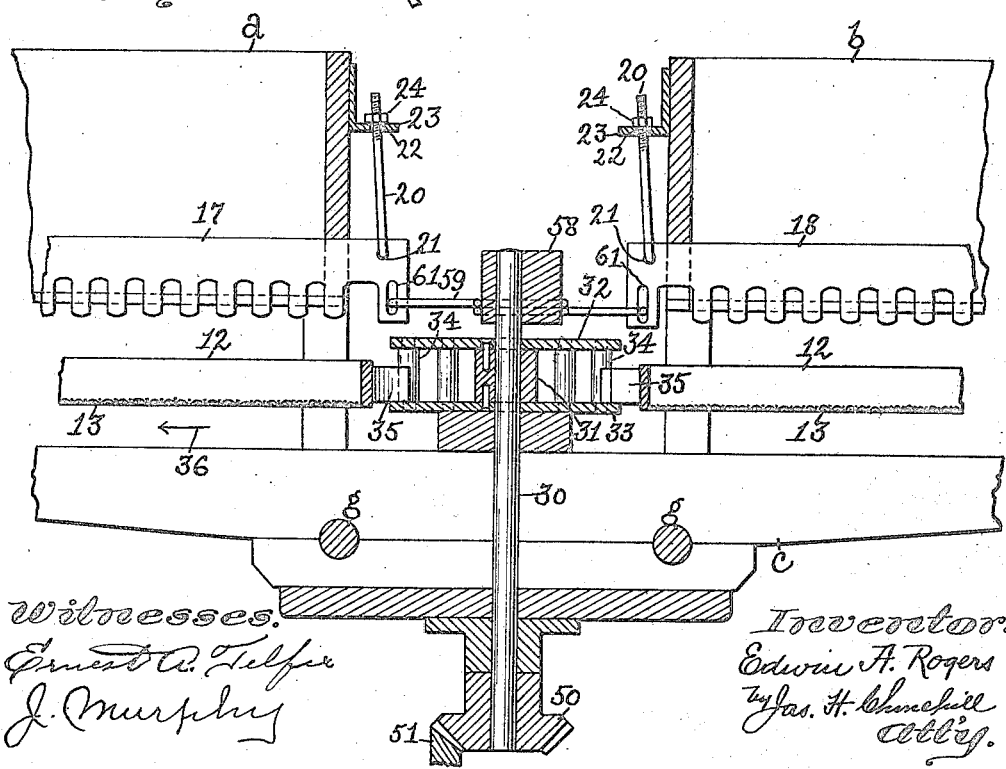

UNITED STATES PATENT OFFICE.

EDWIN A. ROGERS, OF BRUNSWICK, MAINE.

APPARATUS FOR APPLYING POWDERED MATERIAL TO PLANTS, &c.

1,239,042.   Specification of Letters Patent.   Patented Sept. 4, 1917.

Application filed December 30, 1914. Serial No. 879,792.

*To all whom it may concern:*

Be it known that I, EDWIN A. ROGERS, a citizen of the United States, residing in Brunswick, in the county of Cumberland and State of Maine, have invented an Improvement in Apparatus for Applying Powdered Material to Plants, &c., of which the following description, in connection with the accompanying drawings, is a specification, like characters on the drawings representing like parts.

This invention relates to apparatus for distributing materials in powdered form upon plants, vines and the like, and has for its object to provide a simple, inexpensive and efficient apparatus, with which the powdered material in a finely divided condition may be economically and effectively deposited upon the plants, vines, etc.

To this end, the apparatus is provided with a screen, which is located below a box or receptacle containing the plant food or other powdered material, and upon which the said material is discharged from said box or receptacle.

Provision is made for reciprocating said screen and for imparting to the same a blow, which acts to discharge the material through the meshes of the screen and to break up lumps or coarse particles of the plant food or other powdered material, so that it can pass through the screen, thereby avoiding waste of material.

The box or receptacle is provided with a valve, which controls the passage of the material from the box onto the screen, and provision is made for actuating said valve and screen from a single shaft, as will be described. These and other features of this invention will be pointed out in the claims at the end of this specification.

Figure 1:
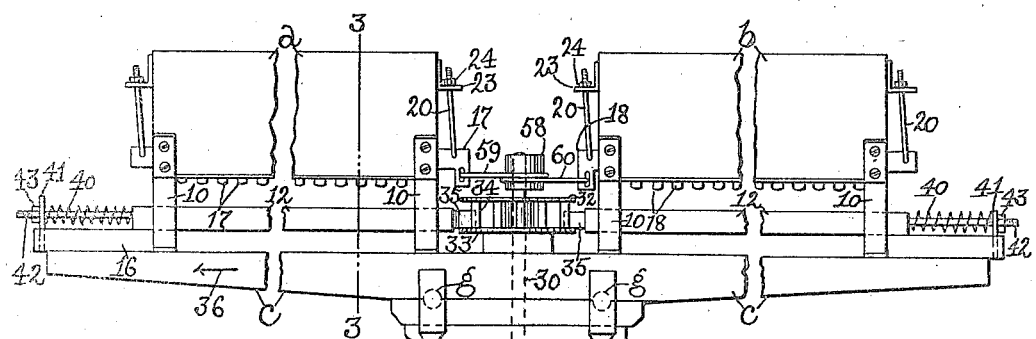

Figure 1 is a front elevation with parts broken away of an apparatus embodying this invention.

Figure 2:
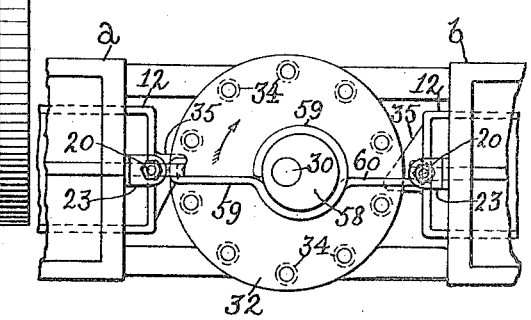

Fig. 2, a detail in plan on an enlarged scale of the screen and its actuating device.

Figure 3:
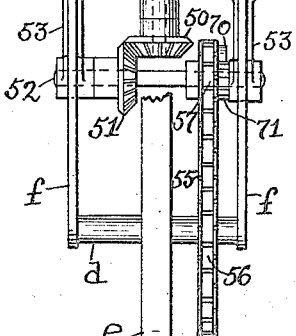

Fig. 3, a cross section on the line 3—3, Fig. 1 on an enlarged scale.

Fig. 4, a detail in elevation and section to show the connection between the actuating shaft for the screen and the driving wheel of the apparatus, and Fig. 5, an enlarged detail in section longitudinally through the boxes or receptacles shown in Fig. 1, and the actuating mechanism for the screens and valves.

In the present instance, the invention is shown in an apparatus provided with two boxes or receptacles $a$, $b$, for containing the plant food or other powdered material which is to be distributed onto the plants, vines, etc., in a finely divided condition. The boxes $a$, $b$, in the present instance are supported by a suitable framework $c$, which in turn is supported from the axle $d$ of a substantially large wheel $e$ located in front of the framework $c$ and having its axle $d$ journaled in hangers $f$, which are attached to rod $g$ extended rearwardly through the framework $c$, and in practice serving also as handles for the operator to grasp, when he desires to move the apparatus.

The boxes $a$, $b$, are supported above the framework $c$ at their corners by uprights 10, and below each box is located a reciprocating screen 12, which may be made as herein shown and comprises an open frame provided with a wire bottom 13, which latter is provided with a substantially fine mesh. The screen 12 is mounted to reciprocate in the direction of its length and is suitably supported for this purpose, as for instance, one end of the screen 12 may rest upon a cross bar 15 connecting the front uprights 10, and the opposite end of the screen may rest on a block or bar 16, secured to or forming part of the framework $c$. The screens 12 receive the plant food from the boxes $a$, $b$, and the delivery of the plant food to said screens is controlled by devices or valves, in the form of bars 17, 18, which extend through the end walls of the boxes and have their lower edge movable in slots in the bottoms of the boxes, see Figs. 3 and 5, and provided with notches or spaces 19, which extend up into the boxes and form outlets for the powdered material in the latter. The boxes $a$, $b$, may be made tapering in cross section as shown in Fig. 3. The notched bars not only serve as valves to regulate the discharge of the powdered material out of the boxes onto the screen, but also serve to agitate the material and break up the lumps more or less. The notched bars or valves 17, 18, are supported at their ends outside of the boxes by links or rods 20, which have their lower ends bent and passed through holes 21 in the bars 17, 18, and have their upper ends extended through holes 22 in brackets 23 secured to the end walls of the boxes The upper ends of the rods 20 are threaded and engaged by nuts 24, which rest on the brackets 23 and by adjusting said nuts on the rods 20, the latter may be raised or lowered to raise or lower the notched edge of the bars or valves 17, 18, in their boxes, and thereby regulate the discharge of the powdered material out of the boxes on to the screens 12.

Provision is made for reciprocating the screens 12 and for imparting to them a blow so as to shake or agitate the material on the screens and thereby break up any small particles or lumps and also facilitate the passage of the material through the screens.

In the present instance, I have shown one construction of mechanism for effecting this result. To this end, the framework $c$ supports in suitable bearings between the boxes $a$, $b$, an upright shaft 30, see Figs. 1 and 5, having fast on it a hub 31, to which is fastened two disks 32, 33, between which are located a series of rollers 34, which are journaled on the disks and are circumferentially arranged about the disks and spaced apart a sufficient distance from one another to permit an inclined nose piece or cam 35 attached to each screen 12 to enter the space between adjacent rollers. As a result, each of the rollers 34 in the revolution of the disks 32, 33, strikes the cam 35 on each screen and moves the latter longitudinally in one direction, namely in the direction of the arrow 36, in Figs. 1 and 5. On this movement of the screen 12, a spring 40 is compressed between the end of the screen and an upright 41 on the framework, through which is extended a guide rod 42 on which the spring 40 is placed. The guide rod 42 is threaded at its outer end and is engaged by a nut 43, which coöperates with the upright to limit the movement of the screen in the opposite direction, by the spring 40, and thereby also cause said spring to impart to the screen a blow, which serves to agitate or shake the material on the screen.

The inner end of the screen may be supported by the cross bar 15 or the cam 35 can rest on the lower disk 33 so as to support the inner end of the screen, as herein shown, the rollers 34 being located within the circumference of the disk, so as to insure the cam being supported by the latter when the screen is at the end of its movement in the direction of the arrow 36. When the rollers 34 are thus arranged the cross bar 15 may be dispensed with if desired.

Provision is made for operatively connecting the shaft 30 with the axle of the wheel $e$, so that the latter acts to drive the said shaft. To this end, the shaft 30 is provided with a bevel pinion 50, which meshes with a like pinion 51 on a counter shaft 52, which is journaled in hangers 53 attached to the framework $c$.

The counter shaft 52 is connected with the axle $d$ by a link chain 55, which is passed about a sprocket wheel 56 on the axle and about a smaller sprocket wheel 57 on the counter shaft. It will thus be seen that rotation of the wheel $e$ drives the counter shaft 52, which in turn drives the shaft 30.

Provision is also made for reciprocating the valves 17, 18, from the shaft 30, and for this purpose, said shaft is provided with a hub 58, which is eccentrically mounted thereon and is engaged by eccentric straps, in the form of rods 59, 60, which are bent at their outer ends to enter elongated and vertically arranged slots 61 in the valves 17, 18. The eccentric straps 59, 60, are reversely arranged, so as to simultaneously move the valves in the same direction.

It will thus be seen, that at each revolution of the shaft 30, the valves 17, 18, are given a complete reciprocation in their boxes $a$, $b$, with the result that the material therein is broken up and fed in a substantially continuous manner onto the screens 12, which at each revolution of the shaft 30 have imparted to them a number of reciprocations.

In the present instance, the disks 32, 33, are provided with ten rollers 34, so that for each revolution of the shaft 30, the screens are reciprocated ten times, whereby the material on the screens is sifted through the same in a substantially continuous stream.

I have herein shown the invention as embodied in a manually propelled apparatus, but it is not desired to limit the invention in this respect as the apparatus may be otherwise propelled. So also, the invention may be embodied in an apparatus provided with a single supply box valve and screen. I have herein shown one way in which the screens are reciprocated but it is not desired to limit the invention to the particular means shown. Provision is made for moving the apparatus from one place to another without actuating the screens 12 or valves 17, 18, and to this end, the sprocket wheel 57 is loose on the shaft 52 and has pivoted to it a pawl 70, which engages a toothed hub or ratchet wheel 71 fast on the shaft 52. By throwing the pawl 70 out of engagement with the ratchet wheel 71, the sprocket wheel 57 is rendered loose on the shaft 52, so that the wheel $e$ may be rotated without rotating the shaft 52 and therefore without operating the valves or screens. When it is desired to operate the valves and screens, the pawl 70 is turned down into engagement with the ratchet wheel 71.

Claims:

1. In an apparatus of the character described, in combination, a box for containing powdered material having an outlet in its bottom, a valve for controlling said outlet, a screen located below said outlet, a rotatable shaft, means on said shaft for moving said screen in one direction, means independent of said shaft for moving said screen in the opposite direction, and independent means on said shaft for reciprocating said valve, substantially as described.

2. In an apparatus of the character described, in combination, a framework, a box for containing powdered material supported by said framework above the same and provided with an outlet for said powdered material, a reciprocating screen carried by said framework above the same and located between the framework and the outlet for said box, a vertically arranged rotatable shaft carried by said framework and extended above and below the same, disks mounted upon said shaft above said framework, a plurality of rollers carried by said disks and spaced apart, a cam attached to said screen coöperating with said rollers, a spring to act on said screen in opposition to said rollers, and means located below said framework for rotating said shaft.

3. In an apparatus of the character described, in combination, a box for containing powdered material having an outlet in its bottom, a valve for controlling said outlet, a screen located below said outlet, a rotatable shaft, an eccentric on said shaft connected with said valve to reciprocate the same, a device on said shaft for moving said screen in one direction, means for moving the said screen in the opposite direction, and means for suddenly arresting the screen at the end of its movement toward said shaft.

In testimony whereof, I have signed my name to this specification in the presence of two subscribing witnesses.

EDWIN A. ROGERS.

Witnesses:
  FRED HUSSEY,
  J. H. ROUSSEAU.

Copies of this patent may be obtained for five cents each, by addressing the "Commissioner of Patents, Washington, D. C."